(12) United States Patent
Shovick

(10) Patent No.: US 6,170,388 B1
(45) Date of Patent: Jan. 9, 2001

(54) COOKING DEVICE

(76) Inventor: Robert C. Shovick, Rt. #11 Box #106-6, Lake City, FL (US) 32024-9804

( * ) Notice: Under 35 U.S.C. 154(b), the term of this patent shall be extended for 0 days.

(21) Appl. No.: 09/502,288

(22) Filed: Feb. 11, 2000

(51) Int. Cl.[7] .............................. A47J 37/00; A47J 37/06; A47J 37/08
(52) U.S. Cl. ................. 99/331; 99/339; 99/342; 99/349; 99/372; 99/385; 99/389
(58) Field of Search ............... 99/326–333, 337, 99/338, 339, 340, 342, 349, 372–384, 385–393, 422, 423, 446–450; 219/622, 492, 627, 494, 452.13, 457.1, 497, 400, 521; 126/380.1, 25 R, 41 R

(56) References Cited

U.S. PATENT DOCUMENTS

| | | | |
|---|---|---|---|
| 2,985,094 | * 5/1961 | Shaw et al. ............................ | 99/342 |
| 3,596,590 | * 8/1971 | Harris .................................. | 99/447 X |
| 5,280,152 | * 1/1994 | Lee ...................................... | 99/451 X |
| 5,473,976 | * 12/1995 | Hermansson ........................ | 99/372 X |
| 5,586,488 | * 12/1996 | Liu ....................................... | 99/331 |
| 5,695,668 | * 12/1997 | Boddy .............................. | 219/400 X |
| 5,765,469 | * 6/1998 | Schlosser et al. ..................... | 99/337 |
| 5,802,958 | * 5/1961 | Hermansson .......................... | 99/349 |

* cited by examiner

Primary Examiner—Timothy F. Simone

(57) ABSTRACT

A cooking device for evenly cooking the food without having to turn the food over in the cooking vessel. The cooking device includes a bottom heating member which includes a housing having a top side with one or two heating elements securely disposed in the top side; and also includes a top heating member which includes a housing having a top side and a bottom side and having one or two heating elements securely disposed in the bottom side; and further includes a plurality of support members for supporting the top heating member above the bottom heating member.

10 Claims, 2 Drawing Sheets

COOKING DEVICE

BACKGROUND OF THE INVENTION

1. Field of the Invention

The present invention relates to an easy frying device and more particularly pertains to a new cooking device for evenly cooking the food without having to turn the food over in the cooking vessel.

2. Description of the Prior Art

The use of easy frying device is known in the prior art. More specifically, easy frying device heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,802,958; U.S. Pat. No. 5,473,976; U.S. Pat. No. 2,985,094; U.S. Pat. No. 5,765,469; U.S. Pat. No. 3,596,590; and U.S. Pat. No. 5,280,152.

While these devices fulfill their respective, particular objectives and requirements, the aforementioned patents do not disclose a new cooking device. The inventive device includes a bottom heating member which includes a housing having a top side with one or two heating elements securely disposed in the top side; and also includes a top heating member which includes a housing having a top side and a bottom side and having one or two heating elements securely disposed in the bottom side; and further includes a plurality of support members for supporting the top heating member above the bottom heating member.

In these respects, the cooking device according to the present invention substantially departs from the conventional concepts and designs of the prior art, and in so doing provides an apparatus primarily developed for the purpose of evenly cooking the food without having to turn the food over in the cooking vessel.

SUMMARY OF THE INVENTION

In view of the foregoing disadvantages inherent in the known types of easy frying device now present in the prior art, the present invention provides a new cooking device construction wherein the same can be utilized for evenly cooking the food without having to turn the food over in the cooking vessel.

The general purpose of the present invention, which will be described subsequently in greater detail, is to provide a new cooking device which has many of the advantages of the easy frying device mentioned heretofore and many novel features that result in a new cooking device which is not anticipated, rendered obvious, suggested, or even implied by any of the prior art easy frying device, either alone or in any combination thereof.

To attain this, the present invention generally comprises a bottom heating member which includes a housing having a top side with one or two heating elements securely disposed in the top side; and also includes a top heating member which includes a housing having a top side and a bottom side and having one or two heating elements securely disposed in the bottom side; and further includes a plurality of support members for supporting the top heating member above the bottom heating member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new cooking device which has many of the advantages of the easy frying device mentioned heretofore and many novel features that result in a new cooking device which is not anticipated, rendered obvious, suggested, or even implied by any of the prior art easy frying device, either alone or in any combination thereof.

It is another object of the present invention to provide a new cooking device which may be easily and efficiently manufactured and marketed.

It is a further object of the present invention to provide a new cooking device which is of a durable and reliable construction.

An even further object of the present invention is to provide a new cooking device which is susceptible of a low cost of manufacture with regard to both materials and labor, and which accordingly is then susceptible of low prices of sale to the consuming public, thereby making such cooking device economically available to the buying public.

Still yet another object of the present invention is to provide a new cooking device which provides in the apparatuses and methods of the prior art some of the advantages thereof, while simultaneously overcoming some of the disadvantages normally associated therewith.

Still another object of the present invention is to provide a new cooking device for evenly cooking the food without having to turn the food over in the cooking vessel.

Yet another object of the present invention is to provide a new cooking device which includes a bottom heating member which includes a housing having a top side with one or two heating elements securely disposed in the top side; and also includes a top heating member which includes a housing having a top side and a bottom side and having one or two heating elements securely disposed in the bottom side; and further includes a plurality of support members for supporting the top heating member above the bottom heating member.

Still yet another object of the present invention is to provide a new cooking device that cooks the food more quickly since the food is being cooked from the bottom and from the top simultaneously.

Even still another object of the present invention is to provide a new cooking device that eliminates the mess that can be created by either stirring or flipping the food in the cooking vessel.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
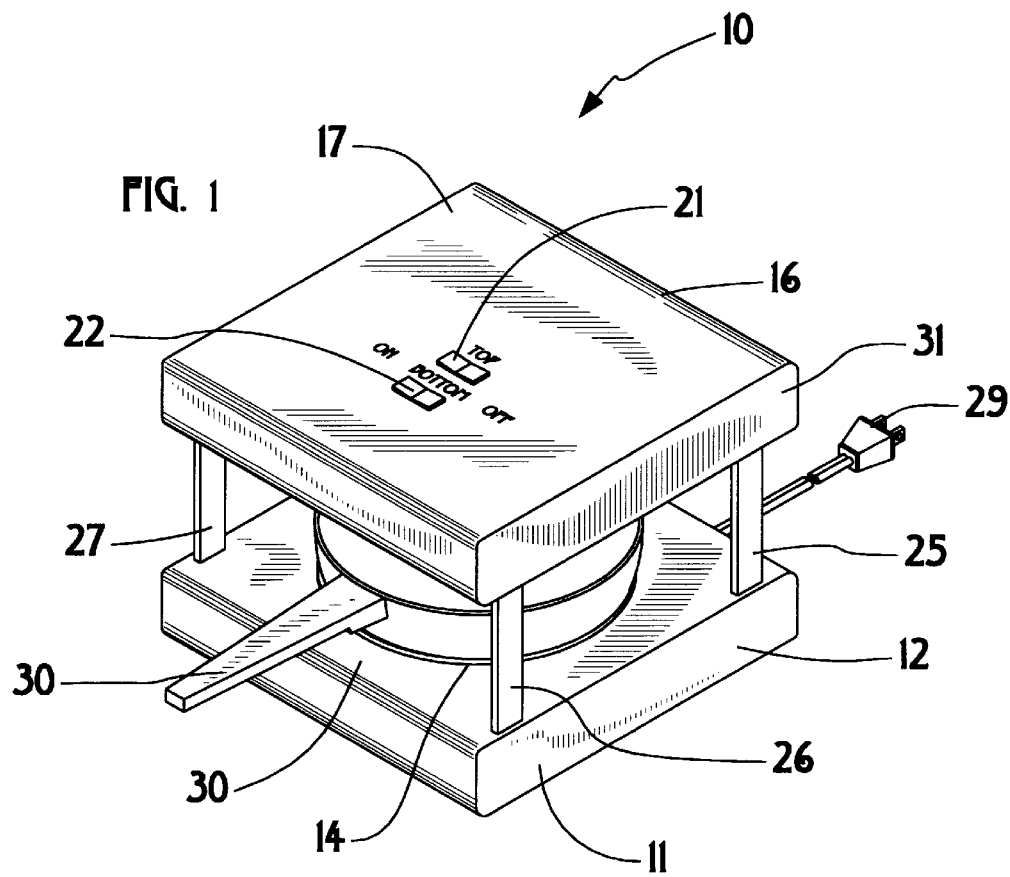
FIG. 1 is a perspective view of a new cooking device according to the present invention and being put to use.
Figure 2:
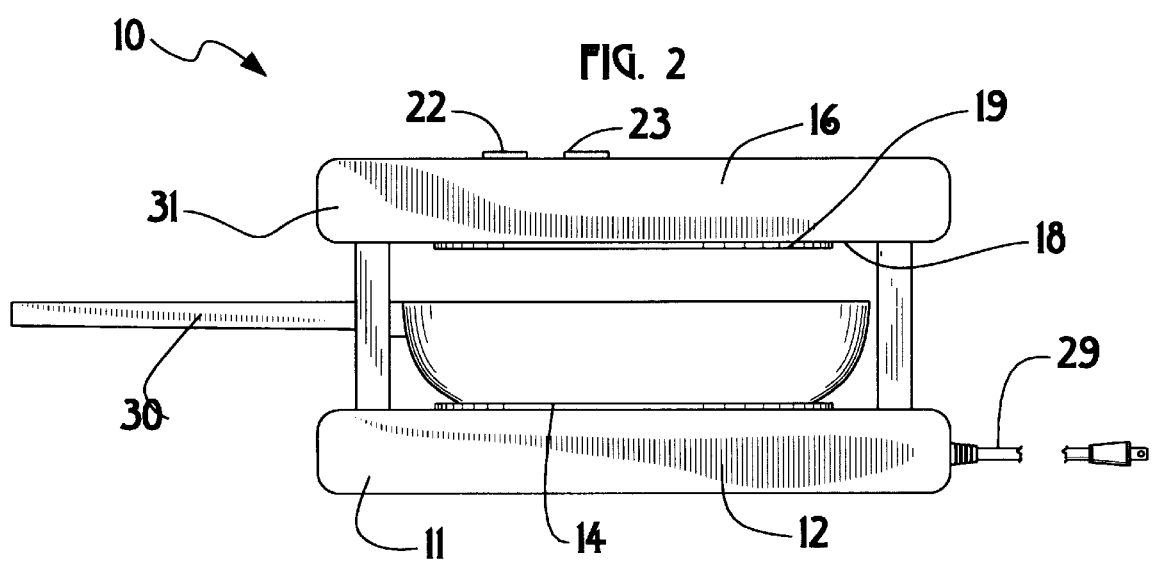
FIG. 2 is a side elevational view of the present invention.
Figure 3:
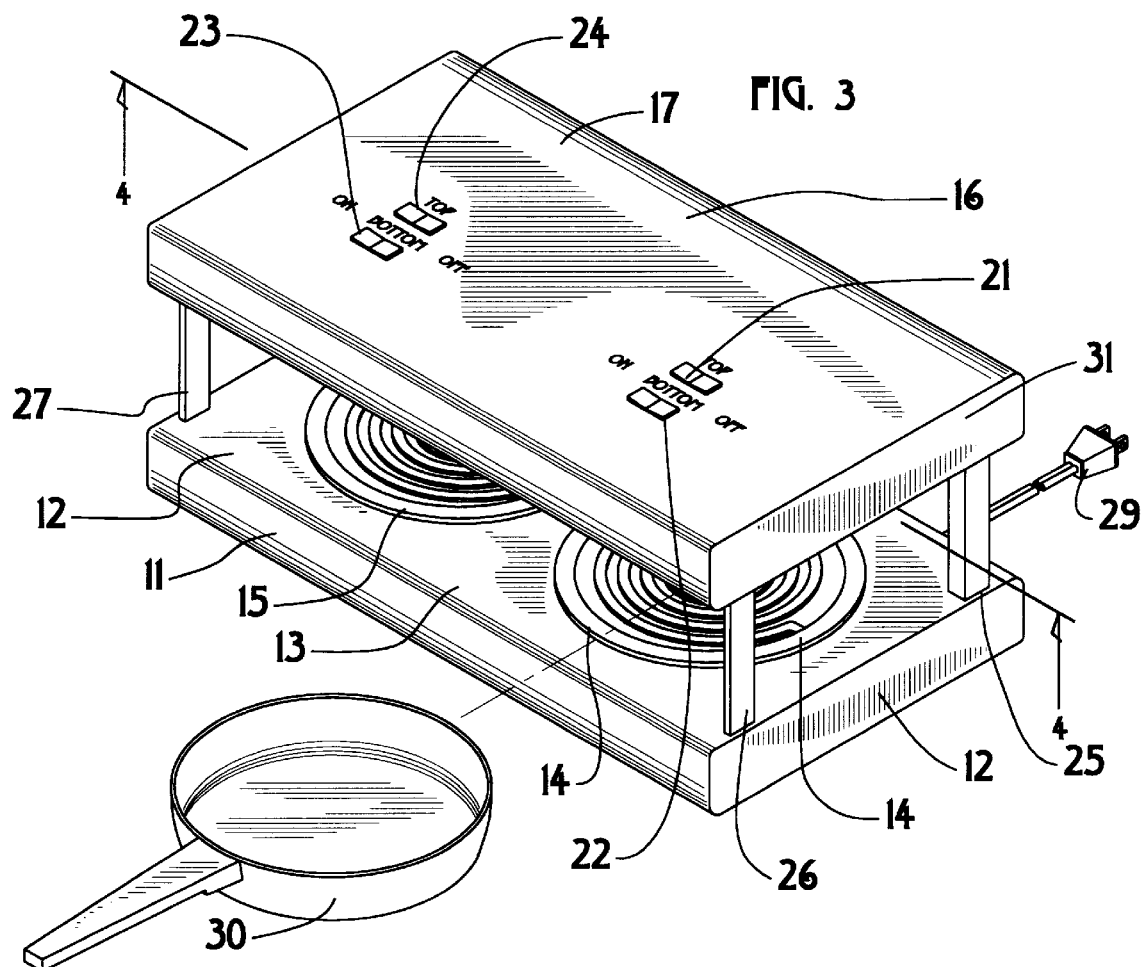
FIG. 3 is a perspective view of the second embodiment of the present invention.
Figure 4:
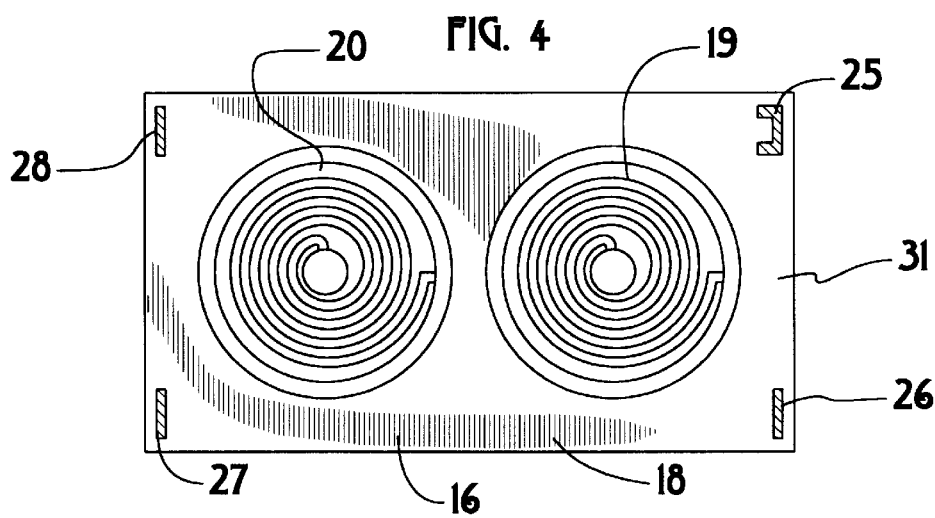
FIG. 4 is a bottom plan view of the top heating member of the second embodiment of the present invention.

With reference now to the drawings, and in particular to FIGS. 1 through 4 thereof, a new cooking device embodying the principles and concepts of the present invention and generally designated by the reference numeral 10 will be described.

As best illustrated in FIGS. 1 through 4, the cooking device 10 generally comprises a bottom heating member 11 including a housing 12 having a top side 13 and further including one heating element 14 securely and conventionally disposed in the top side 13. The heating element 14 of the bottom heating member 11 is adapted to support a cooking vessel 30 thereupon and is arranged in a spiral to form a flat cooking surface thereupon. A top heating member 16 includes a housing 31 having a top side 17 and a bottom side 18 and further includes one heating element 19 securely and conventionally disposed in the bottom side 18. The top heating member 16 is disposed and spaced above the bottom heating member 11 with the heating element 19 of the top heating member 16 being in alignment with the heating element 14 of the bottom heating member 11. The heating element 19 of the top heating member 16 is securely and conventionally exposed on the bottom side 18 thereof and is arranged in a spiral and is adapted to heat food contained in the cooking vessel 30 positioned upon the heating element 14 of the bottom heating member 11. The top heating member 16 includes a plurality of on/off switches 21–24 securely and conventionally disposed in the top side 17 of the housing 31 of the top heating member 11 and is connected to the heating element 19 of the top heating member 16 and to the heating element 14 of the bottom heating member 11 for energizing both of the heating elements 14,19. The on/off switches 21–24 include a pair of on/off switches 21,22 with one 21 of the pair of on/off switches 21,22 being conventionally connected to the heating element 19 of the top heating member 16 and with the other 22 of the pair of on/off switches 21,22 being connected to the heating element 14 of the bottom heating member 11. The space between the heating members 11,16 are adapted to receive a cooking vessel 30 therebetween with each of the heating members 14,19 having a length of approximately 20 inches and having a width of approximately 20 inches. A plurality of support members 25–28 are securely and conventionally attached to the housing 12 of the bottom heating member 11 and extend upwardly therefrom and support the housing 31 of the top heating member 16. A power cord 29 is conventionally connected to the bottom heating member 11 and to the top heating member 16. The support members 25–28 are disposed at the corners of the heating members 11,16 with one 25 of the support members having a portion of the power cord 29 extending therethrough from the bottom heating member 11 to the top heating member 16.

As a second embodiment, each of the heating members 11,16 includes first 14,19 and second 15,20 heating elements with the first heating elements 14,19 of the heating members 11,16 being in alignment with one another and with the second heating elements 15,20 of the heating members 11,16 being in alignment with one another. The first 19 and second 20 heating elements of the top heating member 16 are spaced apart and are disposed in the bottom side 18 thereof, and the first 14 and second 15 heating elements of the bottom heating member 11 are spaced apart and are disposed in the top side 13 thereof.

In use, the user can insert the cooking vessel 30 upon the heating element 14 of the bottom heating member 11 and turn on not only the heating element 14 of the bottom heating member 11 but also the heating element 19 of the top heating member 16 to evenly cook the food contained in the cooking vessel 30.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cooking device comprising:
   a bottom heating member including a housing having a top side and further including at least one heating element disposed in said top side;

a top heating member including a housing having a top side and a bottom side and further including at least one heating element disposed in said bottom side, said top heating member being disposed and spaced above said bottom heating member;

a plurality of support members securely attached to said housing of said bottom heating member and extending upwardly therefrom and supporting said housing of said top heating member;

a power cord connected to said bottom heating member and to said top heating member;

at least one said heating element of said bottom heating member being adapted to support a cooking vessel thereupon; and at least one said heating element of said bottom heating member being arranged in a spiral to form a flat cooking surface thereupon.

2. A cooking device as described in claim 1, wherein said at least one heating element of said top heating member is in alignment with said at least one heating element of said top heating member.

3. A cooking device as described in claim 1, wherein said at least one heating element of said top heating member is exposed on said bottom side thereof.

4. A cooking device as described in claim 1, wherein said at least one heating element of said top heating member is arranged in a spiral and is adapted to heat food contained in the cooking vessel positioned upon said at least one heating element of said bottom heating member.

5. A cooking device as described in claim 1, wherein said top heating member includes a plurality of on/off switches disposed in said top side of said housing of said top heating member and being connected to said at least one heating element of said top heating member and to said at least one heating element of said bottom heating member for energizing both of said at least one heating elements.

6. A cooking device as described in claim 5, wherein said on/off switches include at least one pair of on/off switches with one of said pair of on/off switches being connected to said at least one heating element of said top heating member and with the other of said pair of on/off switches being connected to said at least one heating element of said bottom heating member.

7. A cooking device as described in claim 1, wherein said space between said heating members is adapted to receive a cooking vessel therebetween.

8. A cooking device as described in claim 1, wherein said support members are disposed at corners of said heating members.

9. A cooking device as described in claim 1, wherein said support members include one of said support members through which a portion of said power cord extends from said bottom heating member to said top heating member.

10. A cooking device comprising:

a bottom heating member including a housing having a top side and further including at least one heating element disposed in said top side, said at least one heating element of said bottom heating member being adapted to support a cooking vessel thereupon, said at least one heating element of said bottom heating member being arranged in a spiral to form a flat cooking surface thereupon;

a top heating member including a housing having a top side and a bottom side and further including at least one heating element disposed in said bottom side, said top heating member being disposed and spaced above said bottom heating member, said at least one heating element of said top heating member being in alignment with said at least one heating element of said top heating member, said at least one heating element of said top heating member being exposed on said bottom side thereof, said at least one heating element of said top heating member being arranged in a spiral and being adapted to heat food contained in the cooking vessel positioned upon said at least one heating element of said bottom heating member, said top heating member including a plurality of on/off switches disposed in said top side of said housing of said top heating member and being connected to said at least one heating element of said top heating member and to said at least one heating element of said bottom heating member for energizing both of said at least one heating elements, said on/off switches including at least one pair of on/off switches with one of said pair of on/off switches being connected to said at least one heating element of said top heating member and with the other of said pair of on/off switches being connected to said at least one heating element of said bottom heating member, said space between said heating members being adapted to receive a cooking vessel therebetween, each of said heating members having a length of approximately 20 inches and having a width of approximately 20 inches;

a plurality of support members securely attached to said housing of said bottom heating member and extending upwardly therefrom and supporting said housing of said top heating member; and a power cord connected to said bottom heating member and to said top heating member, said support members being disposed at corners of said heating members and having one of said support members through which a portion of said power cord extends from said bottom heating member to said top heating member.

* * * * *